(No Model.)
J. P. WOOLLEY.
CUT-OFF FOR ELECTRICAL MACHINES.
No. 473,282. Patented Apr. 19, 1892.
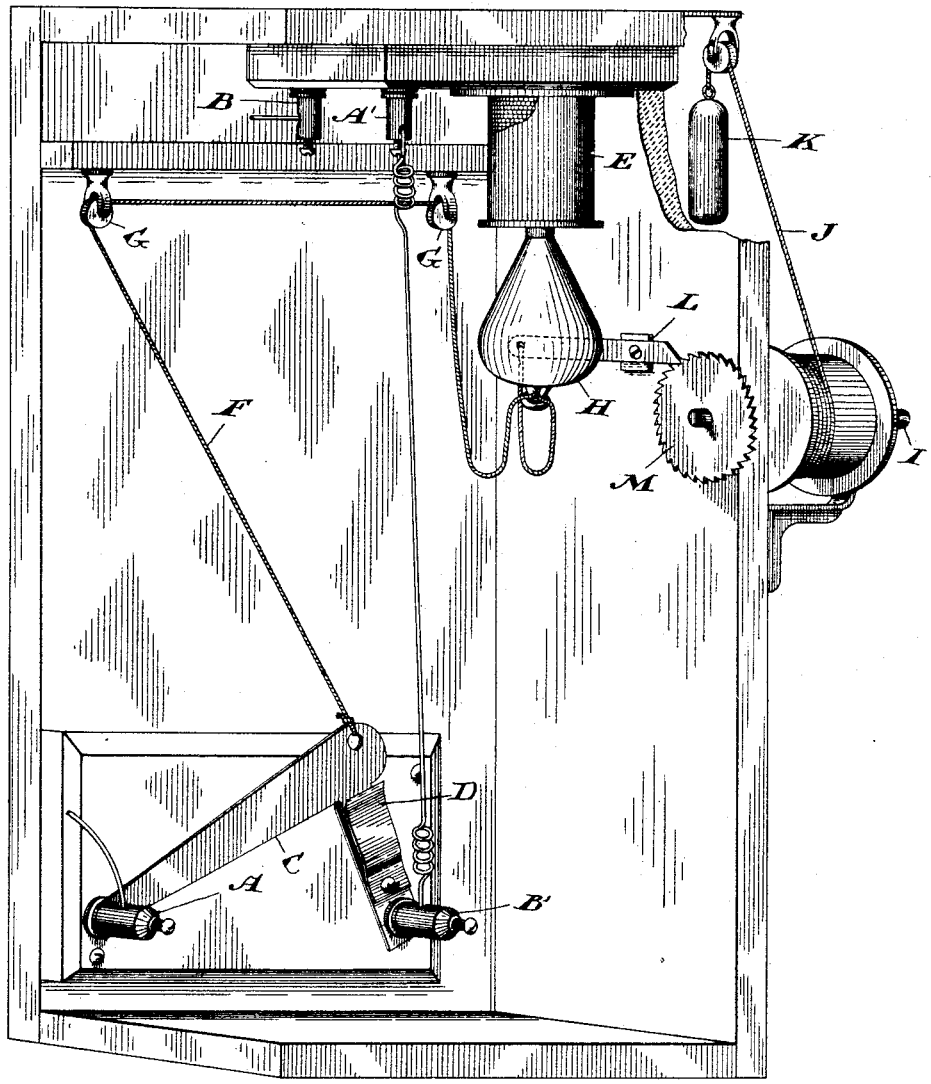
Witnesses  
H. A. Woodward.  
J. Edw. Maybee  
Inventor  
James P. Woolley.  
by D. C. Ridout & Co.  
Att'ys.

UNITED STATES PATENT OFFICE.

JAMES P. WOOLLEY, OF SIMCOE, CANADA.

CUT-OFF FOR ELECTRICAL MACHINES.

SPECIFICATION forming part of Letters Patent No. 473,282, dated April 19, 1892.

Application filed November 23, 1891. Serial No. 412,807. (No model.)

*To all whom it may concern:*

Be it known that I, JAMES P. WOOLLEY, of the town of Simcoe, in the county of Norfolk, in the Province of Ontario, Canada, have invented a certain new and Improved Cut-Off for Electrical Machines, of which the following is a specification.

The object of the invention is to make a simple contrivance by which the electric current shall be instantly cut off in the event of a wire in the main circuit breaking; and it consists, essentially, of a plate pivoted upon the binding-post of one pole and designed to engage with a spring-plate connected to the binding-post of the other pole, the pivoted plate having connected to it a cord arranged around pulleys and provided with a weight suspended by an electro-magnet in the electric circuit, the whole being arranged in such a manner that the breaking of a wire in the circuit will instantly demagnetize the electric magnet and permit the weight attached to the cord to drop and pull the pivoted plate away from the plate with which it is in contact, and thus effectually preventing the circuit being grounded, substantially as hereinafter more particularly explained, and then definitely claimed.

The drawing is a perspective view of the mechanism arranged in connection with my invention.

The wires of an electric-light circuit frequently break from some accidental cause. As the breaking of the wire destroys the circuit, its mere breaking would not do any harm; but there is great danger that contact with the ground may be made by the wire coming in contact with some person or thing capable of acting as a conductor. A broken wire often causes serious accidents, to overcome which my invention is designed.

In the drawing, A is a binding-post, which I assume is a positive pole, and B the binding-post of the negative pole, which poles are in the main circuit.

C is a plate pivoted to the binding-post A and designed to be in contact with a plate D, connected to the binding-post B'.

E is an electro-magnet connected to the posts A' and B, which latter is connected to the post B'.

F is a cord connected to the plate C and carried over the pulleys G, a weight H being attached to its end and suspended from the electro-magnet, as shown.

In the event of the wire breaking the electro-magnet E will immediately be demagnetized, and consequently the weight H will drop, and, acting through the cord F on the plate C, will pull the said plate C from contact with the plate D, and in this way the circuit is permanently broken until the plate C is once more brought in contact with the plate D.

When I use my device in connection with a dynamo run by a water-wheel or other power not properly governed, I connect a spindle I to the gate or cut-off, and on this spindle I wind a cord J, on the end of which a weight K is fixed. A pivoted pawl L engages with a ratchet-wheel M, fixed to the spindle I. The opposite end of the pawl L is connected to the cord F or weight H, so that when the said weight falls the pawl L is drawn away from the ratchet-wheel M, leaving the spindle L free to be acted upon by the falling of the weight K, which weight revolves the spindle so as to close the gate or cut-off.

What I claim as my invention is—

1. The combination, with an electro-magnet, of a weight H, normally suspended under and supported by said magnet, and the cord F, passing over pulleys G and connected to the circuit-breaker C D, substantially as described.

2. The combination, with an electro-magnet, of the weight H, cord F, pulleys G, circuit-breaker C D, revoluble spindle I, a weight K, attached to a cord J, wound around a drum on said spindle, a ratchet-wheel M, mounted on said spindle, a pawl L, engaging therewith and connected to the weight H, whereby said weight H as it falls breaks the electric circuit and liberates the weight K, substantially as described.

Toronto, September 16, 1891.

JAMES P. WOOLLEY.

In presence of—
A. M. NEFF,
I. EDW. MAYBEE.